United States Patent
Lutz et al.

(10) Patent No.: US 7,679,259 B2
(45) Date of Patent: Mar. 16, 2010

(54) CLAW-POLE ROTOR FOR AN ELECTRICAL MACHINE

(75) Inventors: Hans-Joachim Lutz, Lampertheim (DE); Reinhard Meyer, Bietigheim-Bissingen (DE); Guenter Rademacher, Filderstadt-Harthausen (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 10/585,047

(22) PCT Filed: Dec. 30, 2004

(86) PCT No.: PCT/EP2004/053731

§ 371 (c)(1),
(2), (4) Date: Jun. 29, 2006

(87) PCT Pub. No.: WO2005/067123

PCT Pub. Date: Jul. 21, 2005

(65) Prior Publication Data

US 2008/0024033 A1 Jan. 31, 2008

(30) Foreign Application Priority Data

Jan. 2, 2004 (DE) .................. 10 2004 001 844

(51) Int. Cl.
*H02K 1/22* (2006.01)
(52) U.S. Cl. .................. 310/263; 310/51; 310/156.66; 310/156.73; 310/156.71
(58) Field of Classification Search .................. 310/51, 310/263, 156.66, 156.71, 156.73; *H02K 1/22*
See application file for complete search history.

(56) References Cited

U.S. PATENT DOCUMENTS 3,714,484 A * 1/1973 Hebert ...................... 310/263

(Continued)

FOREIGN PATENT DOCUMENTS

EP 0 346 346 12/1989

(Continued)

*Primary Examiner*—Quyen Leung
*Assistant Examiner*—John K Kim
(74) *Attorney, Agent, or Firm*—Michael J. Striker

(57) ABSTRACT

A claw-pole rotor for an electrical machine, in particular a rotary current generator, having two pole wheels (26, 27), which each carry claw poles (28 and 29, respectively), which each originate in a plate region (50) and have a pole root (53), and on a circumference of the claw-pole rotor (20), claw poles (28, 29) of the pole wheels (26, 27) are located in alternation, and located between the claw poles or interstices (90), and a claw pole (28, 29) has a radially outward-oriented cylindrical-jacketlike surface (43), by which a pivot axis (65) is defined, and a chamfer (68) extends on the one hand in a circumferential direction and on the other in an edge direction of a claw pole (28 and 29, respectively), wherein the chamfer (68) has a center portion m in the edge direction that intersects a transition plane (59) which demarcates the pole root (53) and the freely projecting part of the claw pole (28 and 29, respectively), and the center portion m amounts to 8/10 of the length, oriented in the edge direction, of the chamfer (68); and that the claw pole (28, 29) has a width $B_K$, oriented in the circumferential direction, and a half width $B_K$ on the cylindrical surface (43), in a plane of the claw pole (28, 29) that is vertical to the pivot axis (65), defines a point (P), and a tangent (T) can be inscribed into this point (P), and an angle of inclination α which has a magnitude of between 15° and 25° is enclosed between the tangent (T) and the chamfer (68) in the plane that is vertical to the pivot axis (65).

13 Claims, 3 Drawing Sheets

U.S. PATENT DOCUMENTS

| | | | |
|---|---|---|---|
| 4,972,114 A * | 11/1990 | Frister | 310/263 |
| 5,708,318 A * | 1/1998 | Fudono | 310/263 |
| 5,747,913 A * | 5/1998 | Amlee et al. | 310/263 |
| 6,114,793 A * | 9/2000 | Asao et al. | 310/263 |
| 6,424,072 B1 * | 7/2002 | Armiroli et al. | 310/263 |
| 6,476,535 B1 * | 11/2002 | Oohashi et al. | 310/263 |
| 2002/0021052 A1 | 2/2002 | Asao | |
| 2002/0096965 A1 * | 7/2002 | Ikeda et al. | 310/263 |
| 2003/0137214 A1 * | 7/2003 | Ishizuka et al. | 310/263 |

FOREIGN PATENT DOCUMENTS

| | | |
|---|---|---|
| EP | 1 179 879 | 3/2002 |
| EP | 1 331 717 | 7/2003 |
| JP | 51087705 | 7/1976 |
| JP | 03203537 | 9/1991 |

* cited by examiner

CLAW-POLE ROTOR FOR AN ELECTRICAL MACHINE

BACKGROUND OF THE INVENTION

From European Patent EP 0 346 346 B1, an electrical machine with a claw-pole rotor is known. This claw-pole rotor has two pole wheels, which each carry claw poles that each originate in a plate region and that each have a pole root. The claw poles alternate on the circumference of the claw-pole rotor, and free interstices are located between the claw poles. Each claw pole has a radially outward-oriented cylindrical-jacketlike surface, by which a pivot axis of the claw-pole rotor is defined. Each claw pole has a chamfer, originating at the cylindrical-jacketlike surface, that extends on the one hand in a circumferential direction and on the other in an edge direction of the claw pole. With the aid of the chamfers provided on this claw-pole rotor, it is indeed possible to lessen magnetic noise that is caused by the interaction between the claw-pole rotor and the stator. However, in this version shown in this reference, it is disadvantageous that the relatively wide angular range over the entire length of the claw pole leads to relatively major power losses of the rotary current generator. This is associated with the fact that the mean air gap of an individual claw is relatively large because of this chamfer.

SUMMARY OF THE INVENTION

The claw-pole rotor of the invention for an electrical machine, has the advantage that because this relatively steep chamfer is restricted to a small lengthwise portion of an individual claw pole, on the one hand the mean air gap between the stator and the claw pole is relatively small and hence the power is adversely affected only slightly, and on the other, because of the restriction of the angle of inclination, additional noise effects caused by the interrelationship of the rotation of the claw-pole rotor in the stator and the winding are lessened. These noise effects are due to the fact that the winding placed in the stator iron typically has openings immediately in front of the axial face ends of the stator.

A further improvement in efficiency is achieved by providing that the center portion of the chamfer amounts to one-third of the axial length of the chamfer. On the one hand, the mean air gap is thus further reduced, thus increasing the power, and on the other, the production process is facilitated, since less force is required for integrally forming this chamfer, for instance by forging.

For especially good adaptation of this chamfer, it is provided that it has a center in the edge direction that is located close to the transition plane from the pole root to the freely projecting part of the claw pole.

It is especially favorable if the chamfer extends up to 5 mm in the pivot axis direction on the freely projecting part of the claw pole. A further improvement can then be attained if it extends up to 2 mm on the freely projecting part of the claw pole. This lengthwise 2 mm or 5 mm portion that is then typically still located under the stator iron contributes both to attenuating effects between the stator iron and the claw pole and to keeping the mean air gap within favorable limits. With regard to the width of the chamfer, it has been found that in the most favorable case, it has a width of between 4 mm and 6 mm. Similarly, the length of the chamfer is favorably between 4 mm and 6 mm, so that the power of the machine is good. If the chamfer is a plane which is oriented parallel to the pivot axis direction, then a relatively simple tool can be employed for integrally forming the chamfer. This is true for instance for the case where the chamfer is to be forged. On the one hand, the tool direction can be perpendicular to the pivot axis direction, and on the other, the applicable tool is embodied without an acute angle. This lengthens the service life of a corresponding forging tool.

It is furthermore provided that between the chamfer and the cylindrical-jacketlike surface, and thus a transition between the chamfer and the cylindrical-jacketlike surface in the direction toward the tip of a claw pole, is a stepped transition. On the one hand, this step limits the length of the chamfer, so that the mean air gap is not overly large, and on the other, this limitation means that the tool also needs to have only a limited surface area. For a forging operation, this means that the forging tool can be relatively small. This reduces the manufacturing costs.

A rotary current generator is also provided which has a claw-pole rotor of the type described above. The chamfer should project beneath the stator iron in such a way that a portion of the chamfer remains outside the stator iron. This leads to the aforementioned effect that causes of noise from gaps in the winding in the vicinity of the stator iron are avoided or reduced. At a minimum, the chamfer should project at least 1 mm beneath the stator iron. With respect to this chamfer, it also matters that this chamfer is located on a particular side of each claw pole. In rotary current generators, as in many other electrical machines, a certain direction of rotation is defined in which the claw-pole rotor is rotated for generating current. Each claw pole has one edge that is oriented in the direction of rotation and is called the leading edge. Each claw pole also has one edge that is oriented counter to the direction of rotation and is correspondingly called the trailing edge. In that case, the chamfer should be located on the side of the claw pole that has the edge oriented in the direction of rotation.

BRIEF DESCRIPTION OF THE DRAWINGS

In the drawings, one exemplary embodiment of a claw-pole rotor of the invention is shown, along with a rotary current generator having a claw-pole rotor according to the invention.

DETAILED DESCRIPTION OF THE PREFERRED EMBODIMENTS

Figure 1:
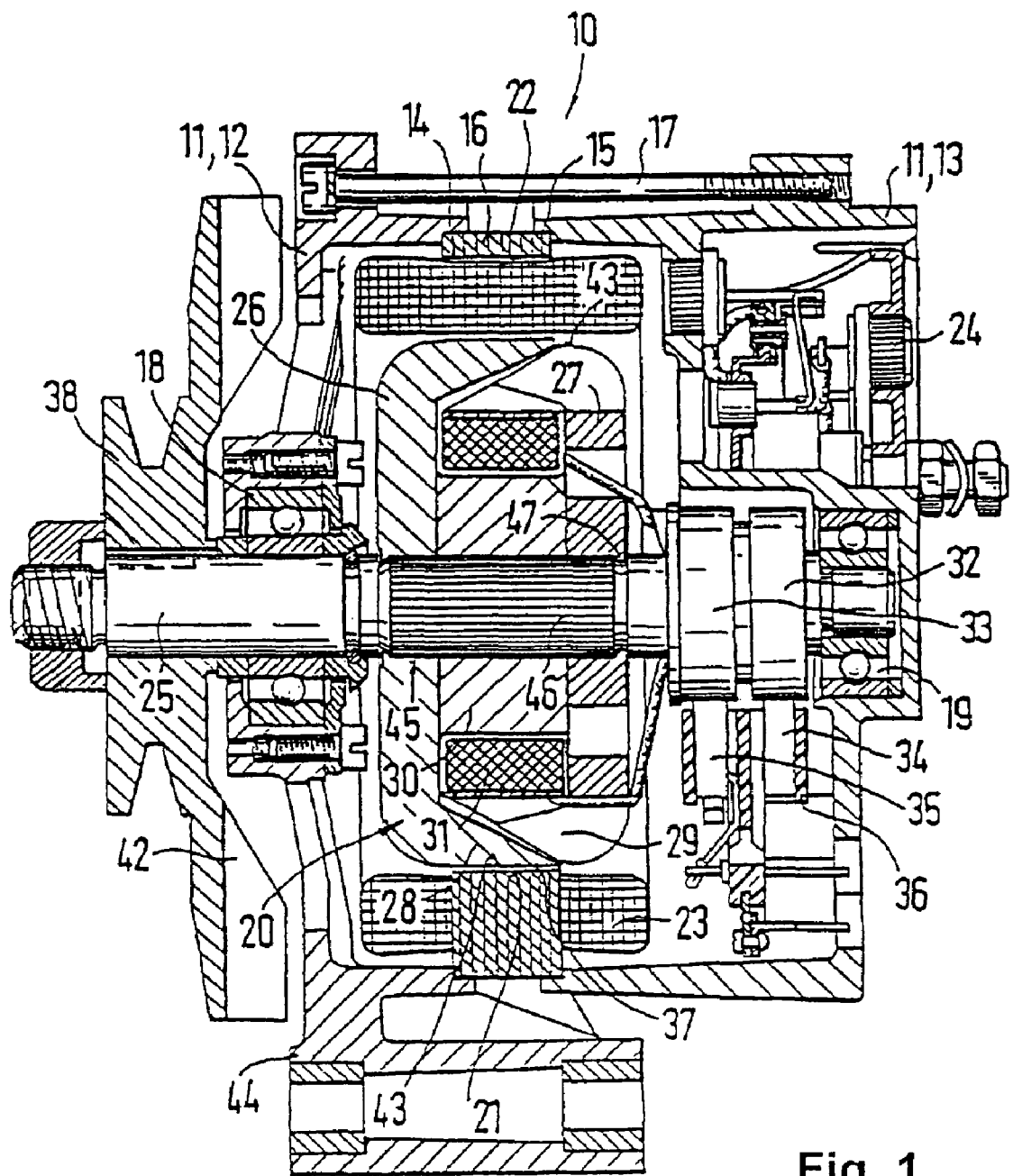
FIG. 1 shows a longitudinal section through a rotary current generator.

The alternating current generator 10 shown in FIG. 1 is a rotary current generator, of the kind presently built into motor vehicles. However, the use of the subject of the invention is not limited to rotary current generators of the cup type as shown in the drawing, but instead is applicable to alternating current generators in general.

This alternating current generator or rotary current generator 10 has as its metal housing two bearing plates 12 and 13, between whose open end regions 14 and 15 a stator 16 is fastened. For connecting the two bearing plates 12 and 13 to the stator 16, stay bolts which are fixed in the two bearing plates 12 and 13 serve as clamping elements 17. The bearing plates 12 and 13 each include a respective ball bearing 18 and 19 for rotatably receiving a claw-pole rotor 20. The stator is composed of metal sheets (laminations), which are of magnetizable iron and are compressed into a solid lamination packet. The essentially annular stator 16 is provided, in a stator bore 21, with slots 22 for receiving alternating current windings 23. In this rotary current generator 10, the alternating current windings 23 are three electrical wavelike windings offset spatially by 120°, which in operation of the alternating current generator output a three-phase usable generator current to a schematically shown rectifier 24 that is secured to the alternating current generator 10. The rectifier 24 converts the rotary current into direct current. The claw-pole rotor 20 is essentially composed of a rotor shaft 25, received rotatably in the ball bearings 18 and 19; two pole wheels 26 and 27, fixed with spacing from one another to this rotor shaft 25, along with their claw poles 28 and 29, respectively; a pole core 30 of magnetizable material, which is slipped onto the rotor shaft 25 as well and is located between the two pole wheels 26 and 27; an exciter winding 31, wound onto the pole core 30 and surrounded by both pole wheels 26 and 27 an also by the claw poles 28 and 29 that extend parallel to the rotor shaft 25; and furthermore, two wiper rings 32 and 33, also fixed to the rotor shaft 25 side by side and spaced apart from one another, each connected electrically to a respective end of the exciter winding 31. Pressing against the two wiper rings 32 and 33 is a respective spring-loaded wiper brush 34 and 35, respectively, and these brushes are guided in a brush holder 36 that is common to both of them, and they deliver the exciter current to the exciter winding 31 that revolves with the claw-pole rotor 20. The brush holder 36, which is of plastic, is fixed to the bearing plate 13. The higher the exciter current and the greater the rpm of the claw-pole rotor 20, the higher is the voltage generated by the rotary current generator. The exciter current delivered to the exciter winding 31 is dimensioned by a voltage regulator, not shown but usually secured to the alternating current generator 10, in such a way that the generator voltage remains virtually constant over the entire rpm range of the alternating current generator, or of the vehicle engine in question, not shown, and specifically does so regardless of the load and the rpm. The claw-pole rotor 20 preferably has six claw poles 28 and 29 on each of its two pole wheels 26 and 27, respectively, and these claw poles mesh in fingerlike fashion with one another, but with an insulating spacing from one another. One claw pole 28 of the pole wheel 26 and one claw pole 29, located beside it, of the pole wheel 27 together form one claw pole pair. The two claw poles 28 and 29 have different polarities and generate a magnetic field. When the claw-pole rotor 20 is rotating, the usable electric current of the alternating current generator 10 is generated by such magnetic fields in the alternating current windings 23. The air gap located between the claw poles 28 and 29, respectively, and the stator bore 21 is identified by reference numeral 37.

Outside the housing 11 of the alternating current generator 10, a pulley 38 serving to drive the alternating current generator 10 is located on the rotor shaft 25. The pulley 38 and the fan 42, which assures the passage of cooling air through the alternating current generator 10, form a single component. Alternatively, the fan 42 may be a separate component, which may be located either outside or inside the metal housing 11. However, one fan 42 each may be disposed on both sides of the claw-pole rotor 20 inside the housing (so-called compact generator). For securing the alternating current generator 10 to the motor vehicle engine, the bearing plate 12 on the drive side is provided with a pivot arm 44. A second fastening means that is practical for precise fixation of the alternating current generator 10 is not shown in FIG. 1.

Figure 2A:
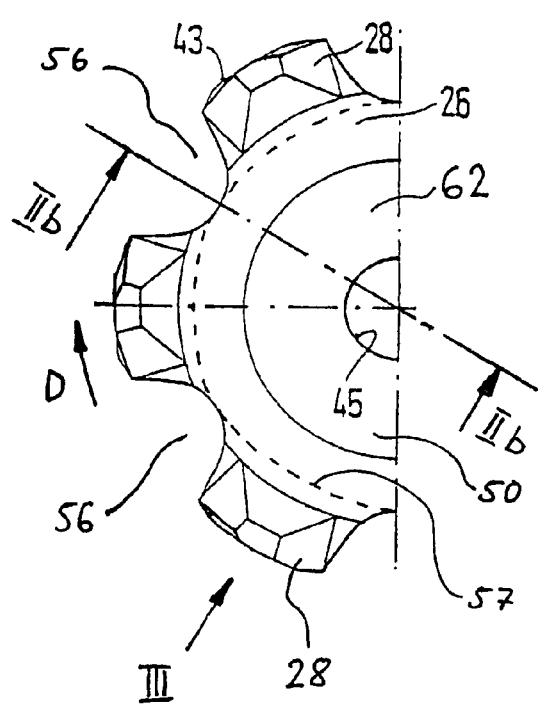
FIG. 2*a* is a view of half of a pole wheel.

In FIG. 2a, the pole wheel 26 is shown with its six claw poles 28 distributed uniformly over its circumference. The pole wheel 26 and the claw poles 28, in the present example, are made from a single piece of magnetizable material, but they may also be assembled from a plurality of individual parts. The pole wheel 27 and its claw pole 29 essentially corresponds to the pole wheel 26 with its claw poles 28. In the center of the pole wheel 26, there is a center bore 45, in which the rotor shaft 25 is fixed. The fixation of the pole wheel on the rotor shaft is preferably accomplished by a knurled region 46 on the corresponding region of the rotor shaft 25 and by additional calked regions 27 between the edge of the center bore 45 of the pole wheel 26 and the rotor shaft 25. On the left-hand side of the pole wheel 26, an arrow and the letter D designate the intended direction of rotation upon generation of the generator current. In FIG. 2a, a plate region 50 of the pole wheel 26 is shown. Beginning at this plate region 50, a pole root 53 initially extends radially outward. Each pole root 53 of each claw pole 28 is separated from the adjacent pole root by an interstice 56. Via the pole root 53, the freely projecting part of the claw pole 28 is braced on the plate region 50. For the sake of clearly defining the freely projecting part of the claw pole 28, the pole root 53, and the plate region 50, the following definition is intended to apply:

The plate region 50 establishes the connection with the rotor shaft 25 and ends radially outward at the place where either the interstice 56 or a pole root 53 begins. The beginning of a pole root 53 radially outward determined by the fact that a circular arc 57—see FIG. 2a—is inscribed between two adjacent interstices 56 and their radially innermost extent or position. Since the innermost extent of each interstice is additionally dependent on its axial position, a complex boundary face between the pole root 53 and the plate region 50 can result.

Figure 2B:
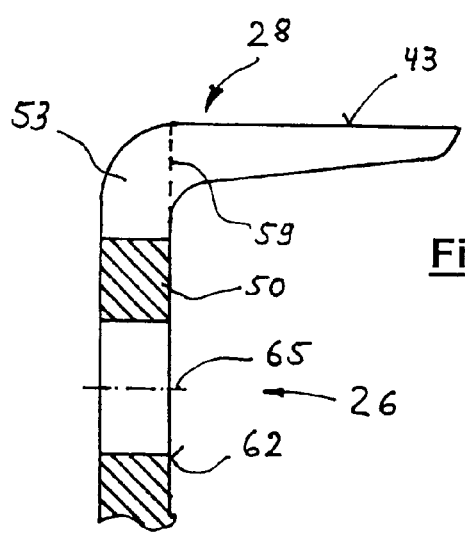
FIG. 2*b* is a section through the pole wheel of FIG. 2*a;*

An axial boundary between the pole root 53 and the freely projecting part of the claw pole 28 is meant to be defined here by the fact that this boundary 59 is a face that is theoretically lengthened radially outward and begins at the surface 62, oriented toward the exciter winding 31, of the plate region 50. The cylindrical surface 43 of the claw pole 28 defines a pivot axis 65 (and vice versa); see also FIG. 2b.

Figure 3:
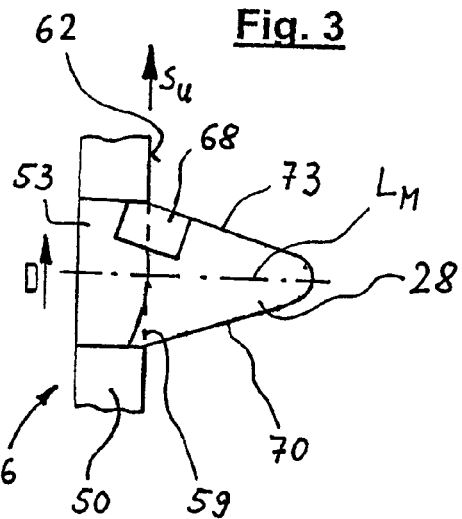
FIG. 3 shows a top view on a claw pole of the pole wheel of FIG. 2*a;*

In FIG. 3, a top view on a claw pole 28 and the adjacent plate region 50 is shown. The plate region 50, the pole root 53, the boundary 59, and the freely projecting part of the claw pole 28 are clearly visible here. This claw pole 28 has two important edges, which can be defined further in terms of the direction of rotation D of the pole wheel 26. The leading edge oriented in the direction of rotation D is here called the edge 73. The other edge 70, since it is oriented counter to the direction of rotation D, is called the trailing edge. The chamfer 68 is located on the side of the claw pole 28 that has the leading edge 73. The edge 73 defines an edge direction in which the chamfer extends in one direction. The direction of rotation D defines a circumferential direction in which the chamfer 68 also extends.

The statement that the chamfer 68 also extends in the edge direction does not mean that a plane formed by the chamfer 68 must necessarily be parallel to the edge 73. The two directions given merely describe a plane in geometric terms.

Figure 4:
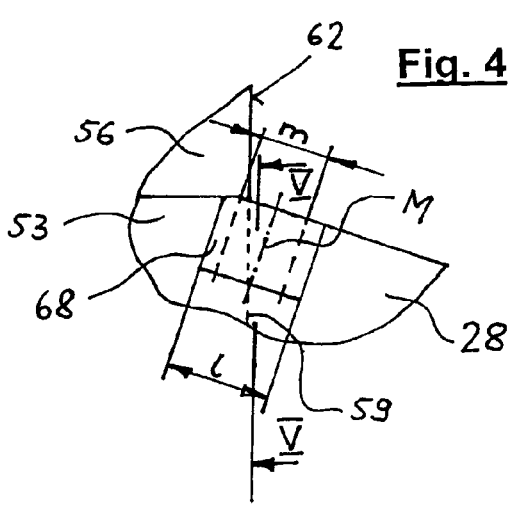
FIG. 4 is a detail view of a chamfer.

FIG. 4, in an enlarged view, shows a detail of the region of the claw pole 28 and of the pole root 53 that defines the near surroundings of the chamfer 68. The chamfer 68 has a length l, which is defined in the edge direction. The chamfer 68 also has a center portion m, which extends in the same direction. The chamfer 68 has a center M, which divides it in the middle in terms of its length l. The center portion m is located symmetrically to the center M. This means that the remaining longitudinal portions on either side of the center portion m are of equal size. The center portion m and the two lateral edge portions thus form the total length l of the chamfer 68. Moreover, the lines boundary lines of the chamfer 68 need not be rectilinear. The boundary line located on the pole root 53, especially, may well assume a shape that is quite different from that. The transition plane 59 from the pole root 53 to the claw pole 28 is also shown here. It is provided that the transition plane 59 intersects the center portion m in the region of the chamfer 68. The center portion m should amount to 8/10 of the axial length l of the chamfer 68.

Figure 5:
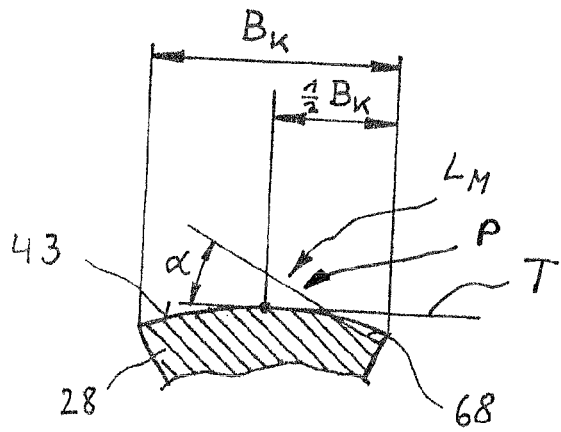
FIG. 5 shows a cross section through a chamfer.

In FIG. 5, a cross section through the claw pole 28 is shown; see also FIG. 4. As indicated in FIG. 5, the claw pole has a width $B_K$ in the circumferential direction. Beginning at the width $B_K$, a center line $L_M$ is defined that divides the surface of a claw pole 28 in half at half the width $B_K$. The center line $L_M$ may—depending on the design of the claw pole 28—be parallel to the pivot axis 65; see also FIG. 3. The center line $L_M$ is also visible as a point P in FIG. 5. At this point P, a tangent T can be inscribed into a plane (in this case the plane of the paper in FIG. 5) oriented vertically to the pivot axis 65, so that the tangent T and the chamfer 68 at the point P define an angle of inclination α that has a size of between 15° and 25°.

Thus a claw-pole rotor 20 for an electrical machine 10, in particular a rotary current generator, is provided, having two pole wheels 26 and 27, each of which, beginning at a plate region 50, has a plurality of claw poles 28 and 29, respectively. Each claw pole 28 and 29 has one pole root 53. On a circumference of the claw-pole rotor 20, claw poles 28 and 29 of the pole wheels 26 and 27, respectively, alternate with one another. Interstices are located between the claw poles 28 and 29. Each claw pole 28 and 29 has a radially outward-oriented cylindrical-jacketlike surface 43, by which a pivot axis 65 is determined. Beginning at the cylindrical-jacketlike surface 43, a chamfer 68 extends on one side in a circumferential direction $s_U$ and on the other in an edge direction of a claw pole 28. In the edge direction, the chamfer 68 has a center portion m, which intersects a transition plane 59 that demarcates the pole root 53 and the freely projecting claw pole 28. It is provided that the center portion m amounts to 8/10 of the axial length l of the chamfer 68. In addition to the definition given in conjunction with FIG. 5, the chamfer has an angle of inclination α of between 15° and 25°, which is formed at a point P between the surface of the chamfer 68 and the tangent T. The point P, at its location with respect to the pivot axis 65, divides a claw pole 28 in half in the circumferential direction. The angle α is ascertained in a plane that is located vertically on the pivot axis 65. The center portion m may, in a further feature of the invention, instead amount to only 1/3 of the axial length l of the chamfer 68.

The chamfer 68 has a center M in the edge direction that is located near the transition plane 59 from the pole root 53 to the freely projecting part of the claw pole 28 and 29, respectively.

It is also provided that the chamfer 68 extends with a length $l_a$ in the pivot axis direction—beginning at the transition plane 59. It is provided that the chamfer 68 extends in the pivot axis direction on the freely projecting claw pole 28 with a length $l_a$ that in a first approximation is up to 5 mm and in a second approximation is 2 mm.

Ideally, the chamfer 68 has a width $b_F$, which amounts to between 4 mm and 6 mm.

The chamfer 68 is intended to have a length l of between 4 mm and 6 mm.

As shown in FIG. 5, the chamfer 68 should be a plane that is oriented, in one exemplary embodiment, parallel to the pivot axis direction 65.

Figure 6:
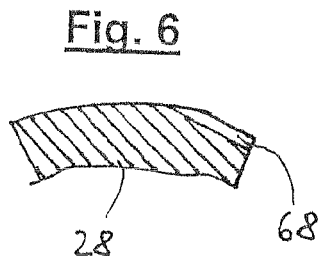
FIG. 6 shows a second cross section through a chamfer.

In the exemplary embodiment of FIG. 6, the chamfer 68 may also be a plane which is oriented parallel to the edge direction 73.

For the case where the chamfer 68 is not a plane but instead a face deviating from a plane, here called a free-form face, these last two characteristics do not pertain. Everything else said above about the chamfer 68 can pertain to either a flat version of the chamfer 68 or a non-flat version of the chamfer 68.

Figure 7:
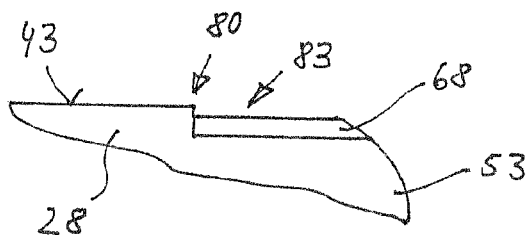
FIG. 7 is a side view on a claw pole in the region of the chamfer.

As shown in FIG. 7, it is provided in a special version that the chamfer 68, in the direction of the free end of a claw pole 28 or 29, has a stepped transition 80 into the cylindrical-jacketlike surface 43. Thus together with the step 80, the chamfer 68 forms a notch 83.

It is provided that the chamfer 68 is integrally formed on without metal cutting, in particular being forged on. It is understood, however, that the chamfer 68 may also be produced by a metal-cutting machining process.

Figure 8:
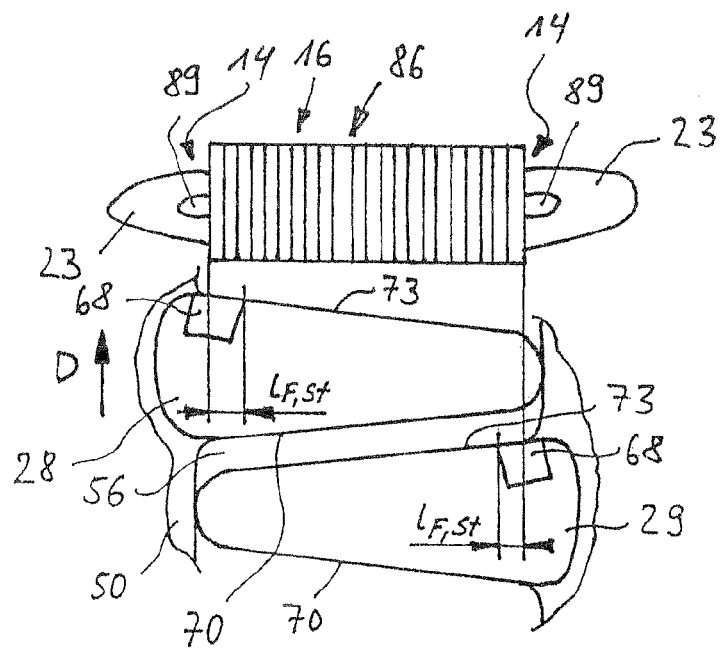
FIG. 8 in a schematic view shows the relative position between the stator iron of the rotary current generator and the claw pole; the surface of the claw pole that is intrinsically oriented toward the stator is rotated in the plane of the paper for the sake of better comprehension.

FIG. 8 shows a detail of part of a generator 10. The stator 16 comprises the stator iron 86 on the one hand and the alternating current winding 23. The alternating current winding 23 has openings 89 near the face-end region 14. Typically, this opening 89 is defined on the one hand by the alternating current winding 23 and on the other by the face-end region of the stator iron 68. If the stator has 36 slots, or 48 slots, for example, then as a rule there are 36 or 48 openings 89, respectively. For the sake of further improved comprehension of the location of the chamfer 68 relative to the stator iron 86, the cylindrical surface 43 shown in FIG. 8 is tilted into the plane of the observer. It is clear from FIG. 8 that a rotary current generator 10 is provided which on the one hand has an annular-cylindrical stator iron 86 and a claw-pole rotor 20 according to the invention, and the chamfer 68 projects beneath the stator iron 86 in such a way that part of the chamfer 68 remains outside the stator iron 86. The stator 68 should project beneath the stator iron 86 by at least one 1 mm. The symbol for this length is $l_{F,st}$.

In FIG. 8, it is also indicated that the rotary current generator 10 has a certain direction of rotation D, in which the claw-pole rotor 20 is rotated to generate current, and each claw pole 28 and 29 has one edge 70 that is oriented counter to the direction of rotation D. Each claw pole also has one edge 73 that is oriented in the direction of rotation D and here is called the leading edge. The chamfer 68 is located on a side of each claw pole 28 and 29 that has the edge 73 that is oriented in the direction of rotation D.

Portions of this description that refer to a claw pole 28 apply analogously to a claw pole 29.

The invention is not limited to pole wheels 26 and 27 each with six claw poles 28 and 29, respectively; it also applies to versions of pole wheels each with seven or even especially eight claw poles 28 and 29 each.

Nor is the invention limited to claw-pole rotors 20 that have free interstices 56; it is also applicable to embodiments of the kind that are filled or closed by means of a claw pole closure, not shown here.

The invention claimed is:

1. A claw-pole rotor for an electrical machine, having two pole wheels (26, 27), which each carry claw poles (28 and 29, respectively), which each originate in a plate region (50) and have a pole root (53), and on a circumference of the claw-pole rotor (20), claw poles (28, 29) of the pole wheels (26, 27) are located in alternation, and located between claw pole interstices (56), and a claw pole (28, 29) has a radially outward-oriented cylindrical-jacketlike surface (43), by which a pivot axis (65) is defined, wherein a chamfer (68) extends on the one hand in a circumferential direction and on the other in an edge direction of a claw pole (28 and 29, respectively), wherein the chamfer (68) has a center (M), wherein the center (M) centrally divides a length (l) of said chamfer (68), wherein the chamfer (68) has a center portion (m) in an edge direction that intersects a transition plane (59) which demarcates the pole root (53) and the freely projecting part of the claw pole (28 and 29, respectively), wherein the center portion (m) is arranged symmetrically relative to the center (M), wherein the center portion (m) amounts to 8/10 of the length, oriented in the edge direction, of the chamfer (68); and wherein the claw pole (28, 29) has a width $B_K$ oriented in the circumferential direction, wherein a half width $B_K$ on the cylindrical surface (43), in a plane of the claw pole (28, 29) that is vertical to the pivot axis (65), defines a point (P), wherein a tangent (T) is inscribable into said point (P), and an angle of inclination α which has a magnitude of between 15° and 25° is enclosed between the tangent (T) and the chamfer (68) in the plane that is vertical to the pivot axis (65), and wherein the tangent (T) lies in a plane that is vertical to the pivot axis (65).

2. The claw-pole rotor as defined by claim 1, wherein the chamfer (68) extends up to 5 mm in the pivot axis direction (65) on the freely projecting part of the claw pole (28 and 29, respectively).

3. The claw-pole rotor as defined by claim 2, wherein the chamfer (68) extends up to 2 mm in the pivot axis direction (65) on the freely projecting part of the claw pole (28 and 29, respectively).

4. The claw-pole rotor as defined by claim 1, wherein the chamfer (68) has a width ($b_F$) of between 4 mm and 6 mm.

5. The claw-pole rotor as defined by claim 1, wherein the chamfer (68) has a length (l) of between 4 mm and 6 mm.

6. The claw-pole rotor as defined by claim 1, wherein the chamfer (68) is a plane which is oriented parallel to the pivot axis direction (65) or parallel to the edge direction (73).

7. The claw-pole rotor as defined by claim 1, wherein between the chamfer (68) and the cylindrical-jacketlike surface (43) is a stepped transition (80).

8. The claw-pole rotor as defined by claim 1, wherein the chamfer (68) is formed integrally in non-metal-cutting fashion, in particular being forged on.

9. A rotary current generator for motor vehicles, having an annular-cylindrical stator iron (86) and having a claw-pole rotor (20) as defined by claim 1, wherein the chamfers (68) project beneath the stator iron (86) in such a way that a portion of the chamfers (68) remains outside the stator iron (86).

10. The rotary current generator as defined by claim 9, wherein the chamfers (68) project at least 1 mm beneath the stator iron (86).

11. The rotary current generator as defined by claim 9, wherein the rotary current generator has a defined direction of rotation (D), in which the claw-pole rotor (20) is rotated to generate current, and each claw pole (28, 29) has one edge (73) that is oriented in the direction of rotation and one edge (70) that is oriented counter to the direction of rotation, and the chamfer (68) is located on the side of the claw pole (28, 29) that has the edge (73) that is oriented in the direction of rotation (D).

12. A claw-pole rotor for an electrical machine, having two pole wheels (26, 27), which each carry claw poles (28 and 29, respectively), which each originate in a plate region (50) and have a pole root (53), and on a circumference of the claw-pole rotor (20), claw poles (28, 29) of the pole wheels (26, 27) are located in alternation, and located between claw pole interstices (56), and a claw pole (28, 29) has a radially outward-oriented cylindrical-jacketlike surface (43), by which a pivot axis (65) is defined, wherein a chamfer (68) extends on the one hand in a circumferential direction and on the other in an edge direction of a claw pole (28 and 29, respectively), wherein the chamfer (68) has a center (M), wherein the center (M) centrally divides a length (l) of said chamfer (68), wherein the chamfer (68) has a center portion (m) in an edge direction that intersects a transition plane (59) which demarcates the pole root (53) and the freely projecting part of the claw pole (28 and 29, respectively), wherein the center portion (m) is arranged symmetrically relative to the center (M), wherein the center portion (m) amounts to ⅓ of the length (l) of the chamfer (68); and wherein the claw pole (28, 29) has a width $B_K$ oriented in the circumferential direction, and a half width $B_K$ on the cylindrical surface (43), in a plane of the claw pole (28, 29) that is vertical to the pivot axis (65), defines a point (P), wherein a tangent (T) is inscribable into said point (P), and an angle of inclination α which has a magnitude of between 15° and 25° is enclosed between the tangent (T) and the chamfer (68) in the plane that is vertical to the pivot axis (65), wherein the tangent (T) lies in a plane that is perpendicular to the pivot axis (65).

13. A claw-pole rotor for an electrical machine, having two pole wheels (26, 27), which each carry claw poles (28 and 29, respectively), which each originate in a plate region (50) and have a pole root (53), and on a circumference of the claw-pole rotor (20), claw poles (28, 29) of the pole wheels (26, 27) are located in alternation, and located between claw pole interstices (56), and a claw pole (28, 29) has a radially outward-oriented cylindrical-jacketlike surface (43), by which a pivot axis (65) is defined, wherein a chamfer (68) extends on the one hand in a circumferential direction and on the other in an edge direction of a claw pole (28 and 29, respectively), wherein the chamfer (68) has a center (M), wherein the center (M) centrally divides a length (l) of said chamfer (68), wherein the chamfer (68) has a center portion (m) in an edge direction that intersects a transition plane (59) which demarcates the pole root (53) and the freely projecting part of the claw pole (28 and 29, respectively), wherein the center portion (m) is arranged symmetrically relative to the center (M), wherein the center portion (m) amounts to 8/10 of the length, oriented in the edge direction, of the chamfer (68); and wherein the claw pole (28, 29) has a width $B_K$ oriented in the circumferential direction, and a half width $B_K$ on the cylindrical surface (43), in a plane of the claw pole (28, 29) that is vertical to the pivot axis (65), defines a point (P), wherein a tangent (T) is inscribable into said point (P), and an angle of inclination α which has a magnitude of between 15° and 25° is enclosed between the tangent (T) and the chamfer (68) in the plane that is vertical to the pivot axis (65), wherein the tangent (T) lies in a plane that is perpendicular to the pivot axis (65), wherein between the chamfer (68) and the cylindrical-jacketlike surface (43) is a stepped transition (80), and wherein the stepped transition (80) is disposed in a direction of free ends of the claw pole (28, 29).

* * * * *